United States Patent [19]

Voll

[11] 4,204,160

[45] May 20, 1980

[54] METAL DETECTOR CIRCUIT WITH AUTOMATIC OPTIMUM SENSITIVITY ADJUSTMENT

[76] Inventor: Walter Voll, Industriestrasse 40,, 8728 Hassfurt, Fed. Rep. of Germany

[21] Appl. No.: 906,809

[22] Filed: May 17, 1978

[30] Foreign Application Priority Data

May 18, 1977 [DE] Fed. Rep. of Germany ....... 2722511

[51] Int. Cl.$^2$ ............................................ G01V 3/08
[52] U.S. Cl. ................................... 324/236; 324/327; 331/65; 331/109; 331/117 R; 331/183
[58] Field of Search ...................... 324/67, 3, 234, 236, 324/239; 361/179–180; 331/65, 117 R, 109, 183

[56] References Cited

U.S. PATENT DOCUMENTS

| | | | |
|---|---|---|---|
| 2,807,720 | 9/1957 | Charles | 331/65 |
| 3,213,390 | 10/1965 | Faith et al. | 331/109 |
| 3,453,532 | 6/1969 | Gardiner | 331/65 |
| 3,688,186 | 8/1972 | Judd | 324/237 |
| 3,714,563 | 1/1973 | Voll | 324/236 |

*Primary Examiner*—Rudolph V. Rolinec
*Assistant Examiner*—Walter E. Snow
*Attorney, Agent, or Firm*—Sughrue, Rothwell, Mion, Zinn and Macpeak

[57] ABSTRACT

A metal detector is disclosed. The detector comprises oscillator circuit means comprising a first transistor, a second transistor, adjustable resistor means coupled to the emitter of the first transistor, and inductor means arranged to control the conductive state of the second transistor. The oscillator circuit means is arranged to generate an electromagnetic field and the second transistor is arranged to provide an output signal in response to and corresponding to any disturbance of the electromagnetic field caused by the presence of a metal article in the electromagnetic field. The detector also comprises indicating circuit means arranged to receive the output signal and to indicate the presence of the metal article in response to the output signal, regulating circuit means arranged to receive the output signal and to control the resistance value of the adjustable resistor means, the regulating circuit means comprising charging circuit means comprising an output terminal, at least one capacitor, and discharging means coupled to the at least one capacitor to discharge the at least one capacitor, and regulating transistor means coupled to the output terminal of the charging circuit means and arranged to reduce the resistance value of the adjustable resistor means only during the presence of the output signal provided by the second transistor, precharging means coupled to the charging circuit means to precharge the charging circuit means, and power supply means selectively connectible to the precharging means and to the oscillator, indicating and regulating circuit means.

6 Claims, 2 Drawing Figures

METAL DETECTOR CIRCUIT WITH AUTOMATIC OPTIMUM SENSITIVITY ADJUSTMENT

BACKGROUND OF THE INVENTION

The present invention relates to a metal detector which finds use in, for example, searching hidden metal articles.

U.S. Pat. No. 3,714,563 describes a metal detector appliance in which the emitter resistance value of a transistor is manually set anew before each operation of the appliance.

U.S. Pat. No. 3,453,532 describes a metal detector appliance which operates with negative feedback which sets in with delay. In this case, the adjustment is undertaken by means of a push-button switch. An indicating measuring device is adjusted by a potentiometer.

Furthermore, a device for the indication of faults in a metal piece is described in U.S. Pat. No. 3,688,186. This device operates with a delayed automatic amplifier control.

SUMMARY OF THE INVENTION

According to the present invention, there is provided a metal detector comprising oscillator circuit means comprising a first transistor, a second transistor, adjustable resistor means coupled to the emitter of the first transistor, and inductor means arranged to control the conductive state of the second transistor, the oscillator circuit means being arranged to generate an electromagnetic field and the second transistor being arranged to provide an output signal in response to and corresponding to any disturbance of the electromagnetic field caused by the presence of a metal article in the electromagnetic field, indicating circuit means arranged to receive the output signal and to indicate the presence of the metal article in response to the output signal, regulating circuit means arranged to receive the output signal and to control the resistance value of the adjustable resistor means, the regulating circuit means comprising charging circuit means comprising an output terminal, at least one capacitor, and discharging means coupled to the at least one capacitor to discharge the at least one capacitor, and regulating transistor means coupled to the output terminal of the charging circuit means and arranged to reduce the resistance value of the adjustable resistor means only during the presence of the output signal provided by the second transistor, precharging means coupled to the charging circuit means to precharge the charging circuit means, and power supply means selectively connectible to said precharging means and to said oscillator, indicating and regulating circuit means.

Advantageously, in a metal detector embodying the invention a manual adjustment of the circuit is redundant during its use and after the balancing-out of the influence of a disturbance of the stray field on the oscillator circuit means, the detector is ready anew for the indication of further influencing of the stray field. Preferably, a detector embodying the invention is ready immediately on the one hand, for an indication after the balancing-out of a disturbance and, on the other hand, after putting it into operation.

As will be described hereinafter, in a metal detector embodying the invention the second transistor delivers a signal analogous to the disturbance of the stray field to the indicating circuit means and to the regulating circuit means, the regulating circuit means being provided with charging circuit means and regulating transistor means connected thereto, the regulating transistor means on a disturbance of the stray field reducing the emitter resistance value of the first transistor until the signal of the second transistor ends, preferably a diode being connected with at least one capacitor of the charging circuit and provided for the discharge thereof and precharging means, preferably a switching-on key with a change-over contact being provided through which the charging circuit is precharged with the appliance switched off. When the stray field is disturbed by a metallic article, the amplitude of oscillation reduces. This is increased by the regulating circuit after a delay time just so far that it again assumes its original value. Advantageously, a metal detector embodying the invention, in use, sets itself to optimum sensitivity without manual adjustment. The indicating signal is switched off after the balancing-out by the second transistor. Since the duration of the balancing-out or of the signal is dependent on the strength of the disturbance, the characteristics of the found metal article may be thereby determined. Advantageously, a wider regulating range is given through the regulation at the emitter resistance of the first transistor determining the amplitude of oscillation. Immediately after the balancing-out of a preceeding disturbance, a further disturbance may be indicated, since the capacitor of the charging circuit is or are rapidly discharged through the diode or diodes connected to them. The charging circuit does not need to be charged up starting from zero on each switching-on of the appliance, since it is held precharged for as long as the appliance is switched off. Thus, a more rapid response of the metal detector appliance may be assured.

Preferably, the emitter resistance of the first transistor may be formed by a first parallel branch determining its maximum value and a second parallel branch determining its minimum value and the resistance value of which is controlled by the regulating circuit. The first parallel branch may be adjusted to a maximum value during the manufacture of the appliance. The second parallel branch causes, in dependence on a disturbance of the stray field, through the regulating circuit a lowering of the total resistance value at the emitter of the first transistor.

In an advantageous development of a metal detector embodying the invention, the charging circuit may be formed of two RC-members, wherein the second RC-member lies parallel to the capacitor of the first RC-member and the base of the regulating transistor lies at the capacitor of the second RC-member. This two-stage charging circuit leads to long delay times of the regulation. Thereby, the respective delay time depends to a large degree on the disturbance of the stray field so that stronger disturbances may be distinguished from weaker ones by reason of the clearly different duration of the indicating signal.

BRIEF DESCRIPTION OF THE DRAWINGS

Embodiments of the invention will now be more particularly described by way of example with reference to the accompanying drawings, in which.

DESCRIPTION OF THE PREFERRED EMBODIMENTS

Figure 1:
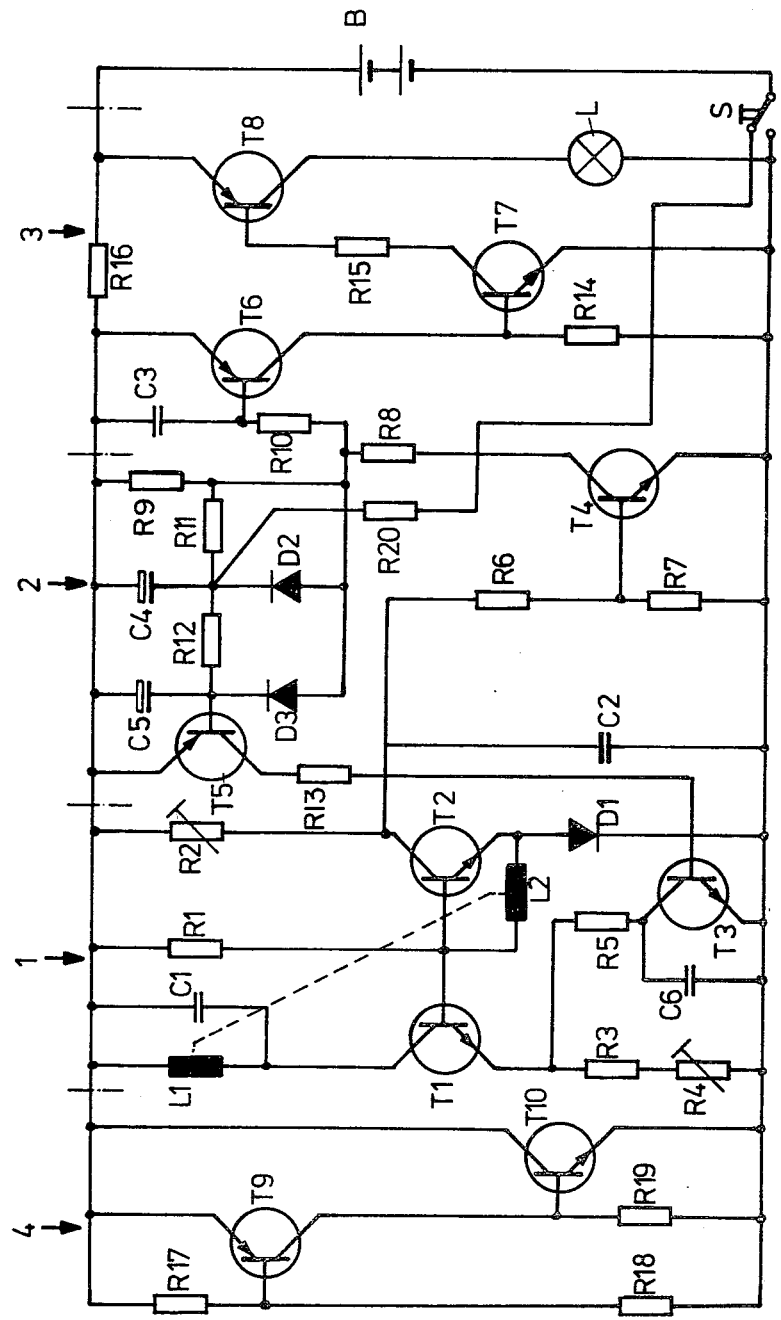
FIG. 1 shows a first embodiment of a metal detector according to the invention.

Referring now to the drawings, the metal detector of FIG. 1 is provided with an oscillator circuit 1, a regulating circuit 2 and an indicating circuit 3 as well as a circuit 4 for the stabilization of voltage. These circuits are connected to a battery B.

The oscillator circuit 1 operates with a resonant loop comprising a capacitor C1 and an oscillator winding L1 which may be mounted either on a ferrite rod or may be constructed as an air-cored coil. The oscillation is maintained by a first transistor T1. The oscillator winding L1 is coupled with a feedback winding L2 which lies parallel to the base-emitter path of a second transistor T2. A common bias resistor R1 is connected to the base of the transistor T1 and to the base of the transistor T2. A diode D1 is connected behind the emitter of the transistor T2. A resistor R2, the resistance value of which lies in the Megohm range, is connected in front of the collector of the transistor T2, which constitutes the output of the oscillator circuit. The resistor R2 is so dimensioned that no voltage step, but only a steep voltage edge arises at the output on the switching of the transistor T2. Two resistors R3 and R4 lie in series at the emitter of the transistor T1. Lying in parallel to the resistor R3 and R4 is the collector emitter path of a further transistor T3 connected in series with a resistor R5. The resistance value of the resistors R3 and R4 is so set that the transistors T2 can securely block independently of component tolerances and temperature influences.

A filter capacitor C2, a voltage divider R6 and R7 and an amplifier stage with a transistor T4 lie at the collector of the transistor T2. The transistor T4 at the same time operates as an inverter for the signal. A resistor R8 and a load resistor R9 is connected in series with the collector-emitter path of the transistor T4. A series circuit of a resistor R10 and a capacitor C3 lies parallel to the load resistor R9.

A two-stage delay circuit comprising capacitors C4 and C5 and resistors R11 and R12, is connected parallel to the load resistor R9. The emitter base path of a regulating transistor T5 lies parallel to the capacitor C5. Its collector is connected through a resistor R13 to the base of the transistor T3, the collector-emitter path of which has a capacitor C6 connected parallel for the shunting of high-frequency voltage. Diodes D2 and D3 together with the load resistor R9 form a discharge circuit for the capacitors C4 and C5.

Lying between the capacitor C3 and the resistor R10 is the base of a three-stage amplifier circuit comprising transistors T6, T7 and T8 and resistors R14 and R15. An indicating lamp or a buzzer is connected to the collector of the transistor T8. In case the edge steepness is not sufficiently high at the output of the oscillator circuit, in place of the three-stage amplifier circuit, an operational amplifier may also be used, the difference voltage inputs of which lie at the poles of the resistor R10.

A bias resistor R16 lies between the battery B and the load resistor R9. The voltage stabilizing circuit 4 comprises transistors T9 and T10. The base of the transistor T9 is connected to a voltge divider comprising resistors R17 and R18. A resistor R19 lies at the base of the transistor T10 which is connected with the collector of the transistor T9.

In the switched-off state of the appliance, a switching-on key S holds the capacitors C4 and C5 precharged through a resistor R20 by a change-over contact. The resistors R20 lies in the region of a few Megohms.

Figure 2:
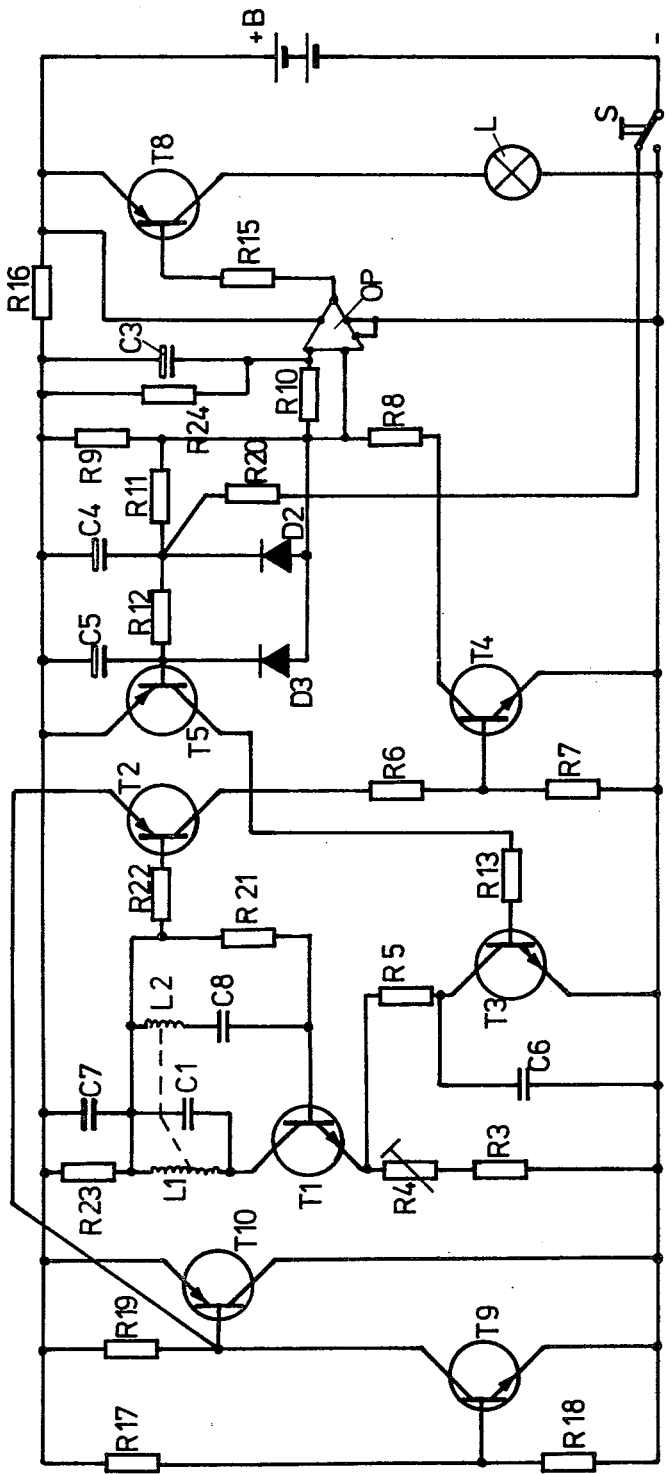
FIG. 2 shows a second embodiment of a metal detector according to the invention.

The circuit according to FIG. 2 is substantially the same as that shown in FIG. 1. A bias resistor R21 is connected to the base of the transistor T1 and a bias resistor R22 is connected to the base of the transistor T2. The resistors R21 and R22 are connected to the supply line through a parallel circuit comprising a resistor R23 and a capacitor C7. In order that the resistor R21 is not bridged over in terms of direct current by the feedback winding L2, a capacitor C8 lies in series with the winding L2. An operational amplifier OP is provided in place of the transistors T6 and T7. A resistor R24 is connected in parallel to the capacitor C3.

The operation of the described circuits is substantially the following:

The metal detector appliance is operationally ready when the switching-on key S is closed and a stray field has built up around the oscillator winding L1. The oscillation frequency is determined by the capacitor C1 and the oscillator winding L1. The transistor T1 maintains the oscillation. A voltage is induced in the feedback winding L2, which voltage is so large that the transistor T2 in FIG. 1 conducts or, respectively, in FIG. 2 blocks; the negative half-wave of the induced voltage may in that case be left out of consideration. The transistor T4 is blocked and practically no voltage drop occurs across the load resistor R9. The capacitors C4 and C5 are discharged through the diodes D2 and D3 or the resistor R9 up to a certain voltage value determined by the resistors R9 and R20, while the switch S was opened (cf. FIGS. 1 and 2). The emitter base voltage value at the emitter of the transistor T1 is practically solely determined by the resistors R3 and R4. These now fix the amplitude of the oscillation.

When a metal article gets into the field, then the amplitude of the oscillation is reduced by reason of the eddy currents induced in the metal. Accordingly, the voltage induced in the feedback winding L2 is also reduced so that the transistor T2 in FIG. 1 gets into the blocked state or, respectively, in FIG. 2 becomes conductive. The transistor T4 becomes more or less conductive according to the strength of the disturbance of the field. Correspondingly, a voltage drop sets in across the load resistor R9. This has the consequence that a charging current flows to the capacitor C3 through the resistor R10. As soon as the forward voltage of the transistor T6 has been exceeded on the capacitor C3 in FIG. 1, this transistor T6 and the transistor T7 as well as the transistor T8 switch through and the indicating unit delivers a signal.

In FIG. 2, the difference voltage inputs of the operational amplifier OP lie parallel to the resistor R10. This switches through during the charging of the capacitor C3 and the indicating unit L delivers a signal. The circuit of FIG. 2 is also very sensitive when the waveform of the output voltage of the transistor T2 is less steep.

At the same time, a change of charge of the capacitor C4 sets in through the resistor R11 delayed in correspondence with the time constant. Correspondingly, the charge on the capacitor C5 also changes, delayed once again through the resistor R12 by the further time constant. As soon as the voltage dropping across the capacitor C5, for example after a few seconds, exceeds the forward voltage of the transistor T5, this becomes conductive, whereby also the transistor T3 becomes conductive. Thereby, the effective resistance value at the emitter of the transistor T1 is reduced so that the amplitude of oscillation correspondingly increases. It increases so far until the transistor T2 is again blocked so that the initially described circuit state is again attained. The influence of the disturbance of the field by the metal article is balanced out by increasing the amplitude of oscillation and the sensor unit can respond anew on a further disturbance, which is brought about by a movement of the metal detector appliance.

Each of the circuits described hereinbefore operates dynamically in the manner that it indicates a relative motion between the metal detector appliance and a metal article and which so balances out the disturbance brought about by the metal article after a short delay time that the circuit is automatically again set to an optimum sensitivity. The circuit displays a wide regulating range and a high sensitivity of response connected with large depth of penetration so that the user need not undertake subsequent adjustments. Component tolerances and temperature influences need not be balanced out specially.

When the metal detection is ended, then the switching-on key is deactivated. This thereby again assumes the setting shown in FIGS. 1 and 2. In this setting, the capacitors C4 and C5 are held precharged through the resistor R20 so that the metal detector appliance is operationally ready on the next switching-on; thus the capacitors C4 and C5 need not first be charged up slowly from zero.

I claim:
1. A metal detector comprising:
(a) oscillator circuit means comprising
 (i) a first transistor;
 (ii) a second transistor;
 (iii) adjustable resistor means coupled to the emitter of the first transistor; and
 (iv) inductor means coupled to the base of the second transistor to control the conductive state thereof;
 the oscillator circuit means being arranged to generate an electromagnetic field and the second transistor being arranged to provide an output signal in response to and corresponding to any disturbance of the electromagnetic field caused by the presence of a metal article in the electromagnetic field;
(b) indicating circuit means arranged to receive the output signal and to indicate the presence of the metal article in response to the output signal;
(c) regulating circuit means arranged to receive the output signal and to control the resistance value of the adjustable resistor means, the regulating circuit means comprising:
 (i) charging circuit means comprising at least one capacitor, and discharging means coupled to the at least one capacitor; and
 (ii) a regulating transistor having a base electrode coupled to said at least one capacitor of the charging circuit means and having a further electrode so connected with the adjustable resistor means as to reduce the resistance value thereof only during the presence of the output signal provided by the second transistor;
(d) precharging circuit means coupled to the charging circuit means to enable the charging circuit means to be precharged; and
(e) power supply means selectively connectible to said precharging circuit means and to said oscillator, indicating and regulating circuit means.

2. A detector as claimed in claim 1, further comprising a switching key provided with a change-over contact arranged to selectively switch said power supply means to the precharging circuit means and to the oscillator, regulating and indicating circuit means.

3. A detector as claimed in claim 1, wherein the adjustable resistor means comprises first and second resistor means connected in parallel, the first resistor means being arranged to set the resistance value of the adjustable resistor means to a maximum, and the second resistor means comprising the collector-emitter path of a further transistor under the control of the regulating circuit means and arranged to vary the resistance value of the adjustable resistor means from a minimum to the maximum.

4. A detector as claimed in claim 1, wherein the discharging means comprises a discharge path for the at least one capacitor, the discharge path being provided with diode means.

5. A detector as claimed in claim 1, wherein the charging circuit means comprises a first and a second RC-network each comprising a respective capacitor and a respective resistor, the first of the two RC-networks being coupled in parallel to the capacitor of the second of the two RC-networks, and the base of the regulating transistor means being coupled to the capacitor of the first RC-network.

6. A detector as claimed in claim 1, comprising a load resistor, and amplifier circuit means arranged to control the voltage drop across the load resistor, the amplifier circuit means having input means coupled to the second transistor to receive the output signal, and the charging circuit means and the indicating circuit means each being coupled to the load resistor.

* * * * *